US011896016B2

(12) United States Patent
Okoniewska et al.

(10) Patent No.: US 11,896,016 B2
(45) Date of Patent: Feb. 13, 2024

(54) SOFT BISCUIT WITH SLOWLY AVAILABLE GLUCOSE

(71) Applicant: Generale Biscuit, Clamart (FR)

(72) Inventors: Monika Okoniewska, East Hanover, NJ (US); Isabel Moreira De Almeida, Saclay (FR); Lélia Notardonato, Saclay (FR); Jérôme Clément, Saclay (FR); Edward C. Coleman, East Hanover, NJ (US); Pierre Berny, Rungis (FR); Pierre-Marie Faye, Saclay (FR); Didier Harichane, Saclay (FR)

(73) Assignee: GENERALE BISCUIT, Clamart (FR)

( * ) Notice: Subject to any disclaimer, the term of this patent is extended or adjusted under 35 U.S.C. 154(b) by 453 days.

(21) Appl. No.: 15/026,730

(22) PCT Filed: Oct. 3, 2014

(86) PCT No.: PCT/US2014/058989
§ 371 (c)(1),
(2) Date: Apr. 1, 2016

(87) PCT Pub. No.: WO2015/051228
PCT Pub. Date: Apr. 9, 2015

(65) Prior Publication Data
US 2016/0249627 A1 Sep. 1, 2016

Related U.S. Application Data

(60) Provisional application No. 61/886,996, filed on Oct. 4, 2013.

(51) Int. Cl.
*A21D 13/062* (2017.01)
*A21D 13/02* (2006.01)
*A21D 2/16* (2006.01)
*A21D 2/18* (2006.01)
*A23L 7/126* (2016.01)
*A21D 13/32* (2017.01)

(52) U.S. Cl.
CPC ........... *A21D 13/062* (2013.01); *A21D 2/165* (2013.01); *A21D 2/181* (2013.01); *A21D 13/02* (2013.01); *A21D 13/32* (2017.01); *A23L 7/126* (2016.08); *A23V 2002/00* (2013.01); *A23V 2200/328* (2013.01)

(58) Field of Classification Search
CPC ........ A21D 13/00; A21D 13/02; A21D 13/32; A21D 13/38; A23L 7/177; A23L 7/122
USPC ........................................................ 426/89
See application file for complete search history.

(56) References Cited

U.S. PATENT DOCUMENTS

| 4,603,055 | A | 7/1986 | Karwowski et al. |
| 6,488,957 | B1* | 12/2002 | Koumarianos ......... A23L 7/115 424/439 |
| 2003/0161861 | A1* | 8/2003 | Lang ...................... A23L 33/40 424/439 |
| 2007/0087084 | A1* | 4/2007 | Coleman .................. A23G 3/34 426/89 |
| 2008/0317932 | A1* | 12/2008 | Long ....................... A23L 7/135 426/618 |
| 2010/0151105 | A1 | 6/2010 | Kameo |
| 2013/0266717 | A1 | 10/2013 | Couttenye et al. |
| 2013/0287920 | A1 | 10/2013 | Couttenye et al. |

FOREIGN PATENT DOCUMENTS

| EP | 1362517 A1 | 11/2003 | |
| FR | WO 2012155154 A2 * | 11/2012 | ............. A21D 13/02 |
| JP | 2006081516 A * | 3/2006 | ............. A01N 65/00 |
| NL | WO 2007095977 A1 * | 8/2007 | ........... A61K 31/715 |
| WO | WO-2011120165 A1 * | 10/2011 | ......... C07K 14/4354 |
| WO | WO-2012120154 A2 * | 9/2012 | ............. A21D 13/02 |
| WO | WO-2012120155 A2 * | 9/2012 | ............. A21D 13/02 |
| WO | 2014152037 A1 | 9/2014 | |

OTHER PUBLICATIONS

Englyst et al; "Glycaemic index of cereal products explained by their content of rapidly and slowly available glucose"; British Journal of Nutrition (2003) i89, pp. 329-339, sourced from https://www.cambridge.org (Year: 2003).*
Angioloni et al., J. Sci. Food Agric., 2011, vol. 91, p. 1283-1292.
Ritika et al., Int. Food Res. J., 2010, vol. 17, p. 1067-1076.
Garsetti et al., J. American College of Nutrition, vol. 24, No. 6, Jan. 1, 2005, pp. 441-447.
International Preliminary Report on Patentability, PCT/US2014/059012, dated Dec. 22, 2014.
International Preliminary Report on Patentability, PCT/US2014/058989, dated Dec. 19, 2014.
Buckwheat cookie, Cookpad, Jul. 7, 2009, http://cookpad.com/recipe/856099 (English translation).
Buckwheat cookie, Cookpad, Feb. 23, 2009, http://cookpad.com/recipe/734070 (English translation).
Buckwheat biscuit, Cookpad, Mar. 3, 2003, http://cookpad.com/recipe/82041 (English translation).
Extended European Search Report, EP 14851006.8, dated Mar. 24, 2017.
Extended European Search Report, EP 14851385.6, dated Mar. 24, 2017.
Notification of Reasons for Refusal, Japanese Patent Application No. 2016-516872, dated Sep. 22, 2017 (English translation).
Notification of Reasons for Refusal, Japanese Patent Application No. 2016-516872, dated Dec. 15, 2016 (English translation).
Reconsideration Report, Japanese Patent Application No. 2016-517414, dated Mar. 26, 2018 (English translation).

(Continued)

*Primary Examiner* — Jyoti Chawla
(74) *Attorney, Agent, or Firm* — Morgan, Lewis & Bockius LLP

(57) ABSTRACT

Methods and products related to a cereal product having a water activity of about 0.4 or more and an SAG content of greater than about 15 g per 100 g of cereal product.

16 Claims, No Drawings

(56) References Cited

OTHER PUBLICATIONS

Decision of Refusal, Japanese Patent Application No. 2016-517414, dated Sep. 1, 2017 (English translation).
Official Action, Japanese Patent Application No. 2016-517414, dated Jan. 27, 2017 (with English translation).
Canadian Official Action for CA 2,923,633, dated Apr. 10, 2017.
Canadian Official Action for CA 2,923,633, dated Jan. 8, 2018.
Canadian Official Action for CA 2,923,635, dated Apr. 10, 2017.
Canadian Official Action for CA 2,923,635, dated Jan. 11, 2018.
USPTO Office Action for U.S. Appl. No. 15/026,733, dated Oct. 11, 2018.
USPTO Office Action for U.S. Appl. No. 15/026,733, dated May 11, 2018.
USPTO Office Action for U.S. Appl. No. 15/026,733, dated Jan. 22, 2018.
USPTO Office Action for U.S. Appl. No. 15/026,733, dated Sep. 5, 2017.
Notice of Reasons for Rejection, Japanese Patent Application No. 2016-517414, dated Sep. 20, 2018 (English translation).
Skrabanja et al.; "Nutritional properties of starch in Buckwheat products: studies in vitro and in vivo"; J. Agric. Food Chem. 2001, vol. 49, No. 1, pp. 490-496.
Functional Modified Starch, Xu Zhong et al., China Light Industry Press, 1st Ed., 1st print in Apr. 2010; 1 page.
Japanese Decision of Refusal for Appln. No. 2016-516872; dated Aug. 23, 2018; 8 pages.
MutilLing translation of Japanese Decision of Refusal for Appln. No. 2016-516872; dated Aug. 23, 2018; 6 pages.
Chinese First Office Action for CN201480053604; dated Feb. 27, 2019; 6 pages.
English translation of Chinese First Office Action for CN201480053604; dated Feb. 27, 2019; 9 pages.
Chinese Second Office Action for CN201480053604; dated Jul. 8, 2019; 6 pages.
English translation of Chinese Second Office Action for CN201480053604; dated Jul. 8, 2019; 10 pages.
Chinese Search Report for CN 2014800536040; dated Feb. 19, 2019; 2 pages.
Examination for EP 14851006.8; dated Nov. 4, 2019; 2 pages.
Annex to the Examination for EP 14851006.8; dated Nov. 4, 2019; 3 pages.
Indian Examination Report based on IN Application No. 201647010824; dated Nov. 1, 2019; 8 pages.
Argentinian Office Action based on AR Patent Application No. P140103689; dated Oct. 9, 2019; 3 pages.
Communication for EP 14851385.6; dated Jan. 27, 2021; 2 pages.
Annex to Communication for EP 14851385.6; dated Jan. 27, 2021; 3 pages.
Argentine Office Action for AR 20140103689; dated Nov. 26, 2020; 6 pages.
Anonymous; "Chocolate Chip Cookies with Buckwheat Groats", Jan. 17, 2012, pp. 1-1, XP055767805, Retrieved from the Internet: URL:https://www.thewednesdaychef.com/the_wednesday_chef/2008/11/chocolate-chip.html [retrieved on Apr. 26, 2021].

\* cited by examiner

SOFT BISCUIT WITH SLOWLY AVAILABLE GLUCOSE

CROSS-REFERENCE TO RELATED APPLICATIONS

This application is a U.S. National Stage Entry of International Patent Application No. PCT/US2014/058989, filed Oct. 3, 2014, which in turn claims the benefit of U.S. Provisional Patent Application No. 61/886,996 filed Oct. 4, 2013 entitled "Soft Biscuit With Slowly Available Glucose", which are incorporated by reference herein in their entirety.

BACKGROUND OF THE INVENTION

The present invention relates to soft-textured food products containing slowly available glucose.

BRIEF SUMMARY OF THE INVENTION

According to some embodiments of the present invention, a cereal product has a water activity of about 0.4 or more and an SAG content of greater than about 15 g per 100 g of cereal product. In some embodiments, the cereal product is baked. In some embodiments, the cereal product includes seeds. The cereal product may include buckwheat grits, groats, and/or cuts.

In some embodiments, the cereal product has a water activity of about 0.4 to about 0.9. In certain embodiments, the cereal product has a moisture content of about 5 wt % or more, or about 5 wt % to about 40 wt %.

In certain embodiments, the cereal product has a soft texture. The cereal product may include inclusions having a texture discernable from the texture of the matrix of baked cereal product. These inclusions may maintain their texture over a shelf life of the baked cereal product, such as, for example, for at least 6 months.

In some embodiments, the inclusions include a cereal and/or seeds. In some embodiments, the inclusions include buckwheat, such as buckwheat grits, groats, and/or cuts.

In certain embodiments, the cereal product is dough-based. In some embodiments, the dough has a moisture content of about 16 wt % or more.

In some embodiments, the cereal product has an unbaked SAG content and a baked SAG content, and the baked SAG content is less than about 40% below the unbaked SAG content.

In some embodiments, the cereal product has a crust portion and a crumb portion, the crust portion enclosing the crumb portion. The SAG content of the crust portion may be greater than 15 g per 100 g of crust portion, preferably greater than about 18 g per 100 g of crust portion, preferably from 15 to 23 g, more preferably from 18 to 22 g, and most preferably from 19 to 21 g per 100 g of crust portion. The SAG content of the crumb portion may be greater than about 15 g per 100 g of crumb portion, preferably from 15 to 20 g and more preferably from 17 to 19 g per 100 g of crumb portion. In some embodiments, the SAG content of the crumb portion per 100 g of crumb portion is at least 70% of the SAG content of the crust portion per 100 g of crust portion, preferably 80-95% of the SAG content of the crust portion per 100 g of crust portion, more preferably 85 to 90%.

In some embodiments, the crust portion has a thickness of from 0.5 to 6 mm, preferably from 1 to 5 mm, more preferably about 4 mm. The crumb portion may have a thickness in the plane of cereal product of from 6 to 14 mm, preferably from 8 to 12 mm, more preferably about 10 mm.

In certain embodiments, the crust portion and the crumb portion each have a Lange number, wherein the Lange number of the crust portion is at least 5 lower than the Lange number of the crumb portion, preferably from 5 to 15 lower and preferably from 7 to 13 lower.

In some embodiments, the crust portion immediately after baking has a moisture content from 4 to 10 wt %, preferably from 4 to 8 wt % by weight of the crust. The crumb portion immediately after baking may have a moisture content from 8 to 14 wt %, preferably from 10 to 14 wt % by weight of the crumb.

In some embodiments, the cereal product has a moisture content from 9 to 15 wt %, more preferably from 9 to 13 wt %, still more preferably from 10 to 13 wt % and most preferably about 11 wt %.

According to some embodiments of the present invention, a method for preparing a baked cereal product includes preparing a dough; forming the dough to provide a dough piece; and baking the dough piece to provide a baked cereal product, such that the baked cereal product has a baked SAG content of at least about 15 g per about 100 g of the baked cereal product and a water activity of about 0.4 or more.

According to some embodiments of the present invention, a food bar includes a water activity of about 0.4 or more; an SAG content of greater than about 15 g per 100 g of food bar; a heat processable binder; and buckwheat in an amount of about 15 wt % or more of the food bar. In some embodiments, the buckwheat includes buckwheat grits, groats, and/or cuts.

According to some embodiments of the present invention, a method for preparing a food bar includes heating a binder to a temperature of about 170° F. or more; and; combining the binder with buckwheat; and cooling to form a food bar, such that, once cooled, the food bar has buckwheat in an amount of about 15 wt % or more of the food bar, a water activity of about 0.4 or more, and an SAG content of greater than about 15 g per 100 g of food bar.

DETAILED DESCRIPTION OF THE INVENTION

Methods and compositions of some embodiments of the present invention relate to soft-textured cereal products containing desirable levels of slowly available glucose ("SAG"), generally associated with a lower-moisture product. SAG refers to the amount of glucose (e.g., from sugar and starch, including maltodextrins) likely to be available for slow absorption in the human small intestine. In one embodiment of the present disclosure, the slowly digestible starch ("SDS") content equals the SAG content because there is no other SAG source than starch, i.e. SDS. Rapidly available glucose (RAG) refers to the amount of glucose likely to be available for rapid absorption in the human small intestine.

SAG, as used herein, is defined and measured according to the Englyst method (as described, for example, in "Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and Slowly Available Glucose", Englyst et al., Br. J. Nutr., 2003(3), 89(3), 329-340; and "Measurement of Rapidly Available Glucose (RAG) in Plant Foods: a Potential In Vitro Predictor of the Glycaemic Response", Englyst et al., Br. J. Nutr., 1996(3), 75(3), 327-337 each of which is incorporated by reference in their entirety herein).

SAG content in a cereal product may be controlled by the formulation of the cereal product as well as the processing conditions involved in preparing the cereal product. In some embodiments, a cereal product with desired levels of SAG provides a beneficial effect in maintaining blood glucose levels over extended time. As used herein, an unbaked cereal product refers to a prepared, formed dough, prior to baking An unbaked SAG refers to the SAG content in the unbaked cereal product. A baked SAG refers to the SAG content in the baked cereal product. As used herein, a baked cereal product refers to cereal products prepared by baking, drying, or any other process which utilizes heat as an aspect of the processing. As used herein, a cereal product refers to a food product including cereal and/or pseudocereal, as described below.

SAG content in a baked product may be associated with the presence of ungelatinized starch. During processing of a cereal product, gelatinization of starch reduces the SAG content. Because starch gelatinization substantially increases in the presence of moisture, one established method of increasing SAG in a baked product is to use a minimal amount of water (a method which would typically not produce a soft baked good) in a cereal product formulation; using lower amounts of water may result in lower levels of starch gelatinization, and therefore higher SAG levels in the finished product.

Surprisingly, however, formulations and methods of embodiments of the present invention provide a higher-moisture baked product, such as a product having a soft texture, while still maintaining a high SAG content. For example, a soft-textured baked cereal product of some embodiments of the present invention may have a water activity ("$A_w$") of greater than about 0.4 and/or a moisture content of about 5 wt % or more, along with an SAG content of greater than about 15 g per 100 g of baked cereal product. In some embodiments, the soft-textured baked cereal product may contain inclusions having a texture which is distinct from the overall soft texture of the baked cereal product, and which maintain (or substantially maintain) their distinct texture throughout the shelf life of the cereal product. In some embodiments, the inclusions may provide a desired textural attribute as well as contribute to the SAG content of the baked cereal product. Formulations and methods of embodiments of the present invention are discussed in further detail below.

Unless noted otherwise, all measurements of the cereal product discussed herein are taken of the cooled cereal product substantially immediately after baking Cereal Product Cereal products of some embodiments of the present invention may be formulated to include desired levels of SAG in a finished product as well as a desired soft texture. In some embodiments, the cereal product includes desired proportions of carbohydrates, fats, and proteins. In some embodiments, higher SAG values are associated with the presence of ungelatinized starch. Starch gelatinization may enable starch to be more easily digested and therefore reduce the SAG in the final product. In some embodiments, inclusion of certain ingredients may provide increased SAG, as well as desired texture, in the baked product.

Cereal products according to embodiments of the present invention can take on any suitable form, including but not limited to biscuits, miniature biscuits, cookies, sandwich cookies, iced cookies, cakes, breads, rolls, pastries, bars or other baked goods.

Carbohydrates

Carbohydrates may be present in the cereal product in the form of sugars, sugar alcohols, oligosaccharides, polysaccharides, including starch fractions and non-starch polysaccharides. It has been found that certain carbohydrate ingredients provide desired levels of SAG, even in a soft-textured baked cereal product. In some embodiments, certain carbohydrate ingredients provide a desired texture, in addition to desired levels of SAG in a soft-textured baked cereal product.

In some embodiments, carbohydrates are provided from sources including but not limited to flour, flakes, grits, cuts from various cereals or pseudocereals, for example, wheat, oat, corn, rye, barley, spelt, millet, sorghum, kamut, triticale, buckwheat, quinoa, and/or amaranth. In some embodiments, carbohydrates are provided from whole grains. All the cereals or pseudo cereals can be whole grain and whole grains can be used in variety of forms for example, in the form of flour, flakes, grits, or cuts. Combinations of all grains, pseudocereals, and variety of their forms can be included in the formulation.

A complete list of cereal and pseudocereal flours can be found in the definition of "whole grains" based on AACC International Whole Grain Task Force. See AACC International www.aacc.net.org/definitions/wholegrain, which is incorporated by reference herein in its entirety. The definition states that, "Cereals are generally considered to be the seed heads of grasses from the Poaceae (synonymous with Gramineous) family. Pseudocereals are seed heads of a number of different species of plants that do not belong to the grass family and do not include legumes or oilseeds. The Task Force decided that the pseudocereals should be included with the cereals because the grain heads of pseudocereals are used in the same traditional ways that cereals are used, such as in the making of bread, starch staples and side dishes. In addition, the overall macronutrient composition (proportions of carbohydrate, protein and fat) of cereals and pseudocereals is similar."

In some embodiments, a cereal product contains carbohydrates in an amount of about 40 wt % to about 95 wt % of the cereal product; about 45 wt % to about 90 wt % of the cereal product; about 50 wt % to about 90 wt % of the cereal product; about 55 wt % to about 85 wt % of the cereal product; about 60 wt % to about 80 wt % of the cereal product; about 65 wt % to about 75 wt % of the cereal product; about 50 wt % of the cereal product; about 55 wt % of the cereal product; about 60 wt % of the cereal product; about 65 wt % of the cereal product; about 70 wt % of the cereal product; about 80 wt % of the cereal product; about 85 wt % of the cereal product; about 90 wt % of the cereal product; or about 95 wt % of the cereal product.

In some embodiments, a cereal product includes starch in an amount of at least about 10 wt % of the cereal product; at least about 15 wt % of the cereal product; at least about 20 wt % of the cereal product; at least about 30 wt % of the cereal product; at least about 35 wt % of the cereal product; at least about 40 wt % of the cereal product; at least about 45 wt % of the cereal product; at least about 50 wt % of the cereal product; at least about 55 wt % of the cereal product; at least about 60 wt % of the cereal product; at least about 65 wt % of the cereal product; at least about 70 wt % of the cereal product; at least about 75 wt % of the cereal product; about 10 wt % to about 75 wt % of the cereal product; about 10 wt % to about 65 wt % of the cereal product; about 10 wt % to about 55 wt % of the cereal product; about 10 wt % to about 50 wt % of the cereal product; about 10 wt % to about 45 wt % of the cereal product; about 15 wt % to about 45 wt % of the cereal product; about 20 wt % to about 45 wt % of the cereal product; about 25 wt % to about 45 wt % of the cereal product; or about 30 wt % to about 40 wt % of the cereal product.

In some embodiments, a cereal product includes flour. Suitable flour may include refined flour and/or whole grain flour. In some embodiments, suitable flour may include thermally treated flour. Wholegrain flour is understood to mean flour produced directly or indirectly from cereal whole grains comprising endosperm, bran and germ. Wholegrain flour may also be reconstituted from separate flours made from endosperm, bran and germ respectively in ratios that give the reconstituted wholegrain flour the same composition as wholegrain flour directly produced from grains that still retain bran and germ. Refined flour is understood to mean flour produced from cereal endosperm only.

In some embodiments, a cereal product may include any suitable whole grain and/or refined flour such as wheat flour, graham flour, buckwheat flour, oat flour, corn flour, rye flour, barley flour, spelt flour, millet flour, teff flour, triticale flour, amaranth flour, quinoa flour, soft wheat flour, hard wheat flour, durum wheat flour, kamut flour, tapioca flour, sago flour, and legume flours such as garbanzo bean flour.

Soft wheat flour may include soft red flour and/or soft white flour. Terms "soft" and "hard" are understood to refer to the hardness of the grains of *Triticum aestivum* used to make the flour, rather than the species of wheat. Hardness of the grains may be due to density of the endosperm cells. Soft wheat endosperm has a lower density, which corresponds to weaker starch and protein bonds. Consequently, soft wheat grains may be crushed into fine particles, damaging less starch than in hard wheat grains.

In some embodiments, a cereal product includes a refined flour in an amount of about 20 wt % to about 95 wt %; about 20 wt % to about 90 wt %; about 20 wt % to about 80 wt % of the cereal product; about 25 wt % to about 75 wt % of the cereal product; about 30 wt % to about 70 wt % of the cereal product; about 35 wt % to about 65 wt % of the cereal product; about 40 wt % to about 60 wt % of the cereal product; about 45 wt % to about 55 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; about 50 wt % of the cereal product; about 55 wt % of the cereal product; about 60 wt % of the cereal product; about 65 wt % of the cereal product; about 70 wt % of the cereal product; about 75 wt % of the cereal product; of about 80 wt % of the cereal product.

In some embodiments, suitable refined flour may include soft wheat flour, wheat flour with low amounts of damaged starch, and/or thermally treated flour such as thermally treated wheat flour. Wheat flour with low damaged starch means a flour with a content of damaged starch lower than 5.5% of the flour weight. Damaged starch content is the percentage of the starch granules that is physically damaged during the milling operation. It may be measured by AACC 76-31.01 method. Examples of thermally treated wheat flours can be wheat flours treated with various number of heating and cooling cycles or annealed Annealing is a hydrothermal treatment that changes the physicochemical properties of starches by improving crystal growth and by facilitating interactions between starch chains.

In some embodiments, refined wheat flour may be made of specifically selected milling fractions such that the flour has a very low water absorption, under 55%, as measured by Brabender® Farinograph® according to NF-ISO-5530-1 norm. In some embodiments, the selected milling fractions have a small particle size, i.e. the percentage of fine particles under 40 μm is above 50%. In contrast, other cereal fractions like groats, grits or cuts may have a larger particle size, for example about 1-2 mm. The selection of milling fractions can be assisted by granulometry analysis (by laser granulometry or mesh diameter) during milling. The measurement by the Brabender® Farinograph® is normalised under NF-ISO-5530-1 norm. Water absorption is defined in this norm as the quantity of water per 100 g of flour at 14 wt % water content needed to have a dough with a maximal consistency of 500 UF. Consistency is the resistance, expressed in arbitrary units (farinographic units UF), of a dough during kneading inside the Farinograph®, at a constant speed specified in the norm. First, water content of the flour is measured. Then, water is added to the flour, with the quantity of water being calculated so that consistency of the dough is close to 500 UF (480 UF to 520 UF). Flour and water are then kneaded together and measurements are recorded for two dough troughs. A water absorption value is obtained from a combination of these consistency/resistance measurements and the volume of water added to the flour to form the dough.

In some embodiments, a cereal product includes wholegrain flour. In certain embodiments, the wholegrain flour comprises at least two different types of wholegrain flours. Suitable types of wholegrain flours may include but are not limited to wholegrain wheat flour, wholegrain barley flour, wholegrain rye flour, wholegrain spelt flour, wholegrain buckwheat flour, wholegrain oat flour, wholegrain rice flour, wholegrain maize flour, wholegrain millet flour, wholegrain kamut flour, wholegrain sorghum flour, wholegrain teff flour, wholegrain triticale flour, and pseudocereal flour such as amaranth flour and quinoa flour, and mixture thereof. In some embodiments, a cereal product may include whole grain flour in an amount of about 20 wt % to about 95 wt %; about 20 wt % to about 90 wt %; about 20 wt % to about 80 wt % of the cereal product; about 25 wt % to about 75 wt % of the cereal product; about 30 wt % to about 70 wt % of the cereal product; about 35 wt % to about 65 wt % of the cereal product; about 40 wt % to about 60 wt % of the cereal product; about 45 wt % to about 55 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; about 50 wt % of the cereal product; about 55 wt % of the cereal product; about 60 wt % of the cereal product; about 65 wt % of the cereal product; about 70 wt % of the cereal product; about 75 wt % of the cereal product; of about 80 wt % of the cereal product.

In some embodiments, a cereal product includes flakes. Flakes may be formed from any suitable grain, including wheat, rye, buckwheat, oats, barley, spelt, triticale, teff, millet, sorghum, quinoa, amaranth, kamut, durum wheat and combinations thereof or from any suitable legume such as garbanzo bean flakes or corn tapioca or sago flakes. The process of preparing flakes and specific processing conditions may depend on the botanical origin of flakes. Some flakes such as rye or barley or wheat may be understood to mean grains that are hydrated and/or steamed and/or heated, and rolled and thereby flattened into a grain flake. The flakes may consist of entire grain berries, such as whole oat flakes, medium oat flakes, quick cooking oats, or can be milled further to reduce their size. In some embodiments, a cereal product includes flakes in an amount of about 0.1 wt % to about 50 wt % of the cereal product; about 0.5 wt % to about 40 wt % of the cereal product; about 1 wt % to about 35 wt % of the cereal product; about 5 wt % to about 30 wt % of the cereal product; about 10 wt % to about 20 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 25 wt % of the cereal product; about 30 wt % of the cereal product; about 35 t % of the cereal product; or about 40 wt % of the cereal product.

In some embodiments, a cereal product includes groats, grits, and/or cuts. Groats, grits, and/or cuts may be formed from any suitable grain or seed, including oats, buckwheat, quinoa, amaranth, millet, wheat, barley, spelt, kamut, triticale, sorghum, corn, or rye and combinations thereof. In some embodiments, a cereal product includes groats, grits, and/or cuts in an amount of about 1 wt % to about 50 wt % of the cereal product; about 1 wt % to about 45 wt % of the cereal product; about 1 wt % to about 40 wt % of the cereal product; about 2 wt % to about 35 wt % of the cereal product; about 3 wt % to about 30 w % of the cereal product; about 4 wt % to about 27 wt % of the cereal product; about 5 wt % to about 25 wt % of the cereal product; about 6 wt % to about 20 wt % of the cereal product; about 7 wt % to about 19 wt % of the cereal product; about 8 wt % to about 18 wt % of the cereal product; about 9 wt % to about 17 wt % of the cereal product; about 10 wt % to about 16 wt % of the cereal product; about 1 wt % of the cereal product; about 2 wt % of the cereal product; about 3 wt % of the cereal product; about 4 wt % of the cereal product; about 5 wt % of the cereal product; about 6 wt % of the cereal product; about 7 wt % of the cereal product; about 8 wt % of the cereal product; about 9 wt % of the cereal product; about 10 wt % of the cereal product; about 11 wt % of the cereal product; about 12 wt % of the cereal product; about 13 wt % of the cereal product; about 14 wt % of the cereal product; about 15 wt % of the cereal product; about 16 wt % of the cereal product; about 17 wt % of the cereal product; about 18 wt % of the cereal product; about 19 wt % of the cereal product; about 20 wt % of the cereal product; about 25 wt % of the cereal product; about 27 wt % of the cereal product; about 30 wt % of the cereal product; about 35 wt % of the cereal product; about 40 wt % of the cereal product; about 45 wt % of the cereal product; or about 50 wt % of the cereal product.

In some embodiments, a cereal product includes whole grains in an amount of at least about 1 wt % of the cereal product; at least about 5 wt % of the cereal product; at least about 10 wt % of the cereal product; at least about 15 wt % of the cereal product; at least about 20 wt % of the cereal product; at least about 25 wt % of the cereal product; at least about 30 wt % of the cereal product; at least about 35 wt % of the cereal product; at least about 40 wt % of the cereal product; at least about 45 wt % of the cereal product; at least about 50 wt % of the cereal product; at least about 55 wt % of the cereal product; at least about 60 wt % of the cereal product; at least about 65 wt % of the cereal product; at least about 70 wt % of the cereal product; at least about 75 wt % of the cereal product; at least about 80 wt % of the cereal product; at least about 85 wt % of the cereal product; at least about 90 wt % of the cereal product; about 1 wt % to about 90 wt % of the cereal product; about 5 wt % to about 90 wt % of the cereal product; about 5 wt % to about 95 wt %; about 10 wt % to about 80 wt % of the cereal product; about 15 wt % to about 75 wt % of the cereal product; about 20 wt % to about 70 wt % of the cereal product; about 25 wt % to about 65 wt % of the cereal product; about 30 wt % to about 60 wt % of the cereal product; about 35 wt % to about 55 wt % of the cereal product; or about 40 wt % to about 50 wt % of the cereal product.

In some embodiments, a cereal product includes sugars (such as mono and disaccharides) in an amount of about 0.1 wt % to about 50 wt % of the cereal product; about 1 wt % to about 30 wt % of the cereal product; about 1 wt % to about 25 wt % of the cereal product; about 1 wt % to about 20 wt % of the cereal product; about 5 wt % to about 15 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 25 wt % of the cereal product; about 30 wt % of the cereal product; about 30 wt % of the cereal product; about 35 wt % of the cereal product; about 40 wt % of the cereal product; about 45 wt % of the cereal product; or about 50 wt % of the cereal product. In some embodiments, a cereal product includes fructose in an amount of up to about 10 wt % of the cereal product; up to about 15 wt % of the cereal product; or up to about 20 wt % of the cereal product. In some embodiments, no more than about 25% of the total carbohydrates in a cereal product are from fructose.

Protein

Cereal products of the present invention may also include protein. Suitable sources of protein may include but are not limited to high protein wheat flour or flakes such as durum wheat or kamut flours or flakes, legume flours or flakes such as garbanzo bean flour or flakes, pea flour or flakes, soybean flour or flakes, whey protein concentrate or isolate, soybean concentrate or isolate, casein concentrate or isolate, milk protein concentrate and isolate, gluten, hydrolized gluten, or egg protein. Proteins can be formulated in as powders or in a form of protein crisps where crisps are prepared from any protein or combination of proteins and potentially some additional ingredients to form a crispy inclusion similar to rice crisps.

In some embodiments, a cereal product may include protein in an amount of about 0.1 wt % to about 30 wt % of the cereal product; about 0.1 wt % to about 25 wt % of the cereal product; about 0.1 wt % to about 20 wt % of the cereal product; about 1 wt % to about 15 wt % of the cereal product; about 1 wt % to about 10 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; or about 35 wt % of the cereal product.

Fat

Cereal products of the present invention may include fat in desired amounts. Fat may be added to the cereal product from any suitable source, including but not limited to shortenings and oils.

In some embodiments, a cereal product may include fat in an amount of about 0.1 wt % to about 40 wt % of the cereal product; about 0.1 wt % to about 25 wt % of the cereal product; about 0.1 wt % to about 20 wt % of the cereal product; about 1 wt % to about 15 wt % of the cereal product; about 1 wt % to about 10 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 35 wt % of the cereal product; or about 40 wt % of the cereal product.

In some embodiments, a cereal product includes canola oil, high oleic canola oil, palm oil, soybean oil, sunflower oil, sufflower oil, cottonseed oil, hydrogenated oils, transesterified oils or combinations of thereof. The choice of the oil may depend on desired textural and nutritional properties of the cereal product.

Water

In some embodiments, it is desirable to use an adequate amount of water to produce a soft-textured cereal product. In some embodiments, the amount of water included in a formulation is determined by the amount necessary to provide desired moistness in the final product.

Water may be added to a dough in an amount about 1 wt % to about 20 wt % of the dough; about 2 wt % to about 18 wt % of the dough; about 3 wt % to about 16 wt % of the dough; about 4 wt % to about 14 wt % of the dough; about 5 wt % to about 14 wt % of the dough; about 5 wt % to about 12 wt % of the dough; about 6 wt % to about 10 wt % of the dough; about 7 wt % to about 8 wt % of the dough; about 1 wt % of the dough; about 2 wt % of the dough; about 3 wt % of the dough; about 4 wt % of the dough; about 5 wt % of the dough; about 6 wt % of the dough; about 7 wt % of the dough; about 8 wt % of the dough; about 9 wt % of the dough; about 10 wt % of the dough; about 11 wt % of the dough; about 12 wt % of the dough; about 13 wt % of the dough; about 14 wt % of the dough; about 15 wt % of the dough; about 16 wt % of the dough; about 17 wt % of the dough; about 18 wt % of the dough; about 19 wt % of the dough; or about 20 wt % of the dough.

In some embodiments, a dough has a moisture content of about 5 wt % to about 50 wt % of the dough; about 7 wt % to about 50 wt % of the dough; about 8 wt % to about 50 wt % of the dough; about 10 wt % to about 50 wt % of the dough; about 12 wt % to about 48 wt % of the dough; about 14 wt % to about 46 wt % of the dough; about 16 wt % to about 44 wt % of the dough; about 16 wt % to about 40 wt % of the dough; about 18 wt % to about 40 wt % of the dough; about 18 wt % to about 42 wt % of the dough; about 20 wt % to about 40 wt % of the dough; about 22 wt % to about 38 wt % of the dough; about 24 wt % to about 36 wt % of the dough; about 26 wt % to about 34 wt % of the dough; about 28 wt % to about 32 wt % of the dough; about 5 wt % of the dough; about 6 wt % of the dough; about 7 wt % of the dough; about 8 wt % of the dough; about 10 wt % of the dough; about 12 wt % of the dough; about 14 wt % of the dough; about 16 wt % of the dough; about 18 wt % of the dough; about 20 wt % of the dough; about 22 wt % of the dough; about 24 wt % of the dough; about 26 wt % of the dough; about 28 wt % of the dough; about 30 wt % of the dough; about 32 wt % of the dough; about 34 wt % of the dough; about 36 wt % of the dough; about 38 wt % of the dough; about 40 wt % of the dough; about 42 wt % of the dough; about 44 wt % of the dough; about 46 wt % of the dough; about 48 wt % of the dough; or about 50 wt % of the dough.

In some embodiments, an unbaked cereal piece has a moisture content of about 18 wt % to about 40 wt % of the unbaked cereal piece; about 20 wt % to about 40 wt % of the unbaked cereal piece; about 22 wt % to about 38 wt % of the unbaked cereal piece; about 24 wt % to about 36 wt % of the unbaked cereal piece; about 26 wt % to about 34 wt % of the unbaked cereal piece; about 28 wt % to about 32 wt % of the unbaked cereal piece; about 18 wt % of the unbaked cereal piece; about 20 wt % of the unbaked cereal piece; about 22 wt % of the unbaked cereal piece; about 24 wt % of the unbaked cereal piece; about 26 wt % of the unbaked cereal piece; about 28 wt % of the unbaked cereal piece; about 30 wt % of the unbaked cereal piece; about 32 wt % of the unbaked cereal piece; about 34 wt % of the unbaked cereal piece; about 36 wt % of the unbaked cereal piece; about 38 wt % of the unbaked cereal piece; or about 40 wt % of the unbaked cereal piece.

In some embodiments, a baked cereal product has a moisture content of about 5 wt % to about 40 wt % of the baked cereal product; about 10 wt % to about 40 wt % of the baked cereal product; about 5 wt % to about 35 wt % of the baked cereal product; about 5 wt % to about 30 wt % of the baked cereal product; about 5 wt % to about 25 wt % of the baked cereal product; about 5 wt % to about 20 wt % of the baked cereal product; about 7 wt % to about 18 wt % of the baked cereal product; about 8 wt % to about 16 wt % of the baked cereal product; about 9 wt % to about 14 wt % of the baked cereal product; about 10 wt % to about 13 wt % of the baked cereal product; about 5 wt % of the baked cereal product; about 6 wt % of the baked cereal product; about 7 wt % of the baked cereal product; about 8 wt % of the baked cereal product; about 9 wt % of the baked cereal product; about 10 wt % of the baked cereal product; about 11 wt % of the baked cereal product; about 12 wt % of the baked cereal product; about 13 wt % of the baked cereal product; about 14 wt % of the baked cereal product; about 15 wt % of the baked cereal product; about 16 wt % of the baked cereal product; about 17 wt % of the baked cereal product; about 18 wt % of the baked cereal product; about 19 wt % of the baked cereal product; about 20 wt % of the baked cereal product; about 22 wt % of the baked cereal product; about 24 wt % of the baked cereal product; about 26 wt % of the baked cereal product; about 28 wt % of the baked cereal product; about 30 wt % of the baked cereal product; about 32 wt % of the baked cereal product; about 34 wt % of the baked cereal product; about 36 wt % of the baked cereal product; about 38 wt % of the baked cereal product; or about 40 wt % of the baked cereal product.

In some embodiment, the baked cereal product has a water activity of about 0.4 or more; about 0.5 or more; about 0.4 to about 0.9; about 0.4 to about 0.8; about 0.5 to about 0.9; about 0.5 to about 0.8; about 0.6 to about 0.7; about 0.4; about 0.5; about 0.6; about 0.7; about 0.8; or about 0.9.

Inclusions

Cereal products of the present invention may include suitable inclusions. Inclusions may provide textural, aesthetic, as well as nutritional benefits. In cereal products of some embodiments of the present invention, an inclusion is understood to be a component of the cereal product that does not become part of the gluten or dough matrix. Such inclusions may be visually or texturally distinguishable as an entity in a cereal product. In some embodiments, a cereal product may contain inclusions such as fruit, legumes, grains, pseudograins, and/or seeds, such as oats, buckwheat, rye, barley, spelt, kamut, wheat, spelt, buckwheat, millet, sorghum, kamut, triticale, quinoa, and/or amaranth. These inclusions can come in variety forms, e.g., groats, grits, cuts, flakes, rice crisps, protein crisps (whey, soy, casein or combinations) and/or chocolate chips, nougat, caramel inclusions, crisps (protein, rice, etc.) any other suitable inclusion, or combinations thereof. Suitable grain inclusions may include those grains and seeds in amounts described in the Carbohydrate section above. Suitable fruit inclusions may include but are not limited to blueberries, strawberries, raspberries, bananas, peaches, raisins, cranberries and the like.

In some embodiments, formulations and methods of the present invention allow for high levels of certain inclusions while maintaining high SAG content in the baked cereal product, even where such inclusions themselves have little or no SAG content. For example, fruit may have little or no SAG content.

In some embodiments, a cereal product includes inclusions in an amount of about 5 wt % or more of the cereal product; about 10 wt % or more of the cereal product; about 15 wt % or more of the cereal product; about 5 wt % to about 30 wt % of the cereal product; about 5 wt % to about 25 wt % of the cereal product; about 7 wt % to about 23 wt % of the cereal product; about 10 wt % to about 20 wt % of the cereal product; about 12 wt % to about 18 wt % of the cereal product; about 5 wt % of the cereal product; about 7 wt % of the cereal product; about 10 wt % of the cereal product; about 12 wt % of the cereal product; about 15 wt % of the cereal product; about 18 wt % of the cereal product; about 20 wt % of the cereal product; about 23 wt % of the cereal product; about 25 wt % of the cereal product; or about 30 wt % of the cereal product.

In some embodiments, inclusions may contribute to the SAG content of the baked cereal product. In some embodiments, inclusions may be selected for their high SAG value, as well as their ability to maintain the SAG content during processing of the baked cereal product. Some grains, such as wheat, may have high initial SAG content, but may lose a substantial amount of SAG during processing due to processing conditions. For example, in cases where higher levels of moisture in the dough and heat are used in preparation of the baked cereal product, such conditions may cause the starch grains having a high natural SAG content to gelatinize thus producing a final product with a low SAG content. It has been found, however, that certain grains and seeds are able to maintain a higher percentage of their SAG content even during processing with high moisture levels and heat. For example, buckwheat, rye, and spelt have high initial SAG values that are substantially maintained during preparation of the baked dough piece. Such grains and/or seeds may be included in any desirable form, including groats, grits, cuts, flakes, and the like.

In some embodiments, inclusions may contribute to the texture of the baked cereal product. In some embodiments, inclusions may be selected in order to provide an inclusion texture that is distinct from the overall soft texture of the baked cereal product. For example, it may be desired to select inclusions which provide a texture that is crunchy, crispy, or chewy, without being overly hard or toothpacking. Such textures may be in contrast to an otherwise soft texture of the baked product matrix and thereby create a dual-texture experience. In some embodiments, it may be desirable to avoid inclusions which absorb moisture from the product matrix to become displeasingly chewy while possibly causing the product to become dry and crumbly. Buckwheat grits, for example, may resist moisture migration from the baked cereal product and retain a crunchy texture. In some embodiments, preferred inclusions maintain their distinct texture and/or the dual texture of the baked cereal product over a shelf life of the baked cereal product, such as a shelf life of at least about 1 month; about 2 months; about 3 months; about 6 months; about 9 months; about 1 year; about 1.5 years; or about 2 years. Examples of inclusions which provide a distinct crunchy texture include buckwheat grits, buckwheat groats, wholegrain buckwheat cuts, and hulled whole millet. Oat cuts may also be acceptable, and may provide a more chewy/dense rather than crunchy texture.

In some embodiments, the particle size of the inclusions may affect the texture of the inclusions. For example, in some embodiments a desirable texture is associated with inclusions having about 85% of their particles within a size range of about 1 mm to about 2 mm.

In some embodiments, inclusions may contribute to the SAG content as well as provide a desirable texture. Examples include, but are not limited to, buckwheat grits, buckwheat groats, wholegrain buckwheat cuts, and/or hulled whole millet.

Additional Components

Cereal products of some embodiments may also include ingredients such as emulsifiers, buffering agents, leavening agents, seasoning, preservatives and sweeteners. Suitable leavening agents may include but are not limited to ammonium bicarbonate, sodium bicarbonate, sodium acid pyrophosphate or mixtures thereof. In one embodiment, a cereal product includes a combination of ammonium bicarbonate, sodium bicarbonate, and sodium acid pyrophosphate. In another embodiment, a cereal product includes a combination of sodium bicarbonate and sodium acid pyrophosphate.

Additional ingredients may include vitamins or minerals such as vitamin B1, B2, B3, B6, B12, iron, magnesium, calcium or mixtures thereof. Cereal products may also include salt, flavoring agents such as vanilla, cocoa powder, milk and dairy derivatives, honey.

Filling

Cereal products of the present invention may also include a filling, for example, to create a cereal product with a layer of filling or a sandwich snack. Any suitable filling may be included, such as sweet or savory fillings. In some embodiments, suitable fillers may be fat or sugar based. In some embodiments, a suitable filling is formulated to provide the desired nutritional, textural and/or flavor properties for the sandwich cereal snack. A filling may be added to the cereal product in any suitable manner, and in some embodiments, the filling is added after baking the cereal product.

In some embodiments, a sandwich cereal snack includes about 18 wt % to about 40 wt % filling; about 20 wt % to about 40 wt % filling; about 25 wt % to about 35 wt % filling; about 28 wt % to about 30 wt % filling; about 18 wt % filling; about 20 wt % filling; about 25 wt % filling; about 28 wt % filling; about 30 wt % filling; about 35 wt % filling; or about 40 wt % filling.

Preparation

In some embodiments, cereal products of the present invention may be prepared according any suitable methods, such as those employed in traditional biscuit preparation, while still maintaining a desired SAG level in the finished product. In some embodiments, cereal products of the present invention may be prepared according to conditions suitable for achieving the desired levels of SAG and moisture in the finished cereal product. In some embodiments, higher SAG content is achieved by using low shear and/or low heat processing conditions. In some embodiments, processing conditions are chosen to minimize damage to the starch in the cereal product formulation. In some embodiments, cereal products of the present invention may be prepared according to the methods described in WO2012/155154, which is incorporated by reference in its entirety herein.

In some embodiments, after preparing a dough, the dough is formed into a dough piece. In certain embodiments, dough pieces may be formed by any suitable method, including pan baking, wire cutting, sheeting and cutting with the reciprocal cutter. The pieces may be transferred to the belt conveyer and further to the oven for baking or a dryer for drying. After processing, the cereal product may then be packaged.

The formed dough pieces may be baked or dried to a desired moisture content. In some embodiments, the moisture content of the baked cereal piece is selected to provide the desired soft texture. In some embodiments, a baked cereal product has a moisture content of about 5 wt % or more of the baked cereal product; about 7 wt % or more of the baked cereal piece; about 10 wt % or more of the baked cereal piece; about 5 wt % to about 40 wt % of the baked cereal product; about 10 wt % to about 40 wt % of the baked cereal product; about 5 wt % to about 35 wt % of the baked cereal product; about 5 wt % to about 30 wt % of the baked cereal product; about 5 wt % to about 25 wt % of the baked cereal product; about 5 wt % to about 20 wt % of the baked cereal product; about 7 wt % to about 18 wt % of the baked cereal product; about 8 wt % to about 16 wt % of the baked cereal product; about 9 wt % to about 14 wt % of the baked cereal product; about 10 wt % to about 13 wt % of the baked cereal product; about 5 wt % of the baked cereal product; about 6 wt % of the baked cereal product; about 7 wt % of the baked cereal product; about 8 wt % of the baked cereal product; about 9 wt % of the baked cereal product; about 10 wt % of the baked cereal product; about 11 wt % of the baked cereal product; about 12 wt % of the baked cereal product; about 13 wt % of the baked cereal product; about 14 wt % of the baked cereal product; about 15 wt % of the baked cereal product; about 16 wt % of the baked cereal product; about 17 wt % of the baked cereal product; about 18 wt % of the baked cereal product; about 19 wt % of the baked cereal product; about 20 wt % of the baked cereal product; about 22 wt % of the baked cereal product; about 24 wt % of the baked cereal product; about 26 wt % of the baked cereal product; about 28 wt % of the baked cereal product; about 30 wt % of the baked cereal product; about 32 wt % of the baked cereal product; about 34 wt % of the baked cereal product; about 36 wt % of the baked cereal product; about 38 wt % of the baked cereal product; or about 40 wt % of the baked cereal product.

In some embodiments, the formed dough pieces are baked or dried to a desired water activity. In some embodiments, the baked cereal product has a water activity of about 0.4 or more; about 0.5 or more; about 0.4 to about 0.9; about 0.4 to about 0.8; about 0.5 to about 0.9; about 0.5 to about 0.8; about 0.6 to about 0.7; about 0.4; about 0.5; about 0.6; about 0.7; about 0.8; or about 0.9.

In some embodiments, cereal products may be prepared through processes other than baking or drying, but which include heat as some aspect of the processing. For example, cereal products may be prepared by cold pressing, using a binder which may be heated to high temperatures before mixing with the other ingredients in the cereal product. In some embodiments, a binder may be heated to temperatures above the gelatinization temperatures of many grains commonly used in cereal products. For example, a binder may be employed at temperatures of about 170° F. to about 180° F., or even about 200° F. or above. As used herein, the term baked cereal product is understood to also include cereal products formed by such processes other than baking or drying, but which include heat in some aspect.

SAG

As described above, SAG content in a baked cereal product may be dependent on the formulation as well as the conditions of preparing the cereal product.

As described above, SAG refers to the amount of glucose (from starch, including maltodextrins) likely to be available for slow absorption in the human small intestine. Rapidly available glucose (RAG) refers to the amount of glucose likely to be available for rapid absorption in the human small intestine. In the Englyst method, food product samples, such as biscuits, are prepared by manually and roughly grinding one or more representative samples of biscuits or reducing biscuits to particulates by an action simulating chewing. The food product samples are then subjected to an enzymatic digestion by incubation in presence of invertase, pancreatic alpha-amylase and amyloglucosidase under standardized conditions. Parameters such as pH, temperature (37° C.), viscosity and mechanical mixing are adjusted to mimic the gastrointestinal conditions. After an enzymatic digestion time of 20 min, glucose is measured and is labeled RAG. After an additional enzymatic digestion of 100 min (total time of 120 min), glucose is again measured and is labeled available glucose (AV) (AG). SAG is obtained by subtracting RAG from (AV) (AG) (SAG=AV AG−RAG), thus, SAG corresponds to the glucose fraction released between the 20th and the 120th minute. SAG is equivalent to SDS. Free sugar glucose (FSG), including the free glucose and the glucose released from sucrose, as well as maltose, are obtained by separate analysis. Rapidly digestible starch ("RDS") is then obtained as the subtraction of FSG and maltose from RAG (RDS=RAG−FSG−maltose).

In some embodiments, a cereal product of the present invention includes an unbaked SAG in an amount of about 5 g or greater per 100 g of the unbaked cereal product; about 10 g or greater per 100 g of the unbaked cereal product; about 15 g or greater per 100 g of the unbaked cereal product; about 15.8 g or greater per 100 g of the unbaked cereal product; about 16 g or greater per 100 g of the unbaked cereal product; about 17 g or greater per 100 g of the unbaked cereal product; about 18 g or greater per 100 g of the unbaked cereal product; about 19 g or greater per 100 g of the unbaked cereal product; about 20 g or greater per 100 g of the unbaked cereal product; about 21 g or greater per 100 g of the unbaked cereal product; about 22 g or greater per 100 g of the unbaked cereal product; about 23 g or greater per 100 g of the unbaked cereal product; about 24 g or greater per 100 g of the unbaked cereal product; about 25 g or greater per 100 g of the unbaked cereal product; about 26 g or greater per 100 g of the unbaked cereal product; about 27 g or greater per 100 g of the unbaked cereal product; about 28 g or greater per 100 g of the unbaked cereal product; about 29 g or greater per 100 g of the unbaked cereal product; about 30 g or greater per 100 g of the unbaked cereal product; about 31 g or greater per 100 g of the unbaked cereal product; about 32 g or greater per 100 g of the unbaked cereal product; about 33 g or greater per 100 g of the unbaked cereal product; about 34 g or greater per 100 g of the unbaked cereal product; about 35 g or greater per 100 g of the unbaked cereal product; about 35 g or greater per 100 g of the unbaked cereal product; about 37 g per 100 g of the unbaked cereal product; about 38 g per 100 g of the unbaked cereal product; about 39 g per 100 g of the unbaked cereal product; about 40 g per 100 g of the unbaked cereal product.

In some embodiments, a cereal product of the present invention includes a baked SAG in an amount of about 5 g or greater per 100 g of the cereal product; about 10 g or greater per 100 g of the cereal product; about 15 g or greater per 100 g of the cereal product; about 15.8 g or greater per 100 g of the cereal product; about 16 g or greater per 100 g of the cereal product; about 17 g or greater per 100 g of the cereal product; about 18 g or greater per 100 g of the cereal product; about 19 g or greater per 100 g of the cereal product; about 20 g or greater per 100 g of the cereal product; about 21 g or greater per 100 g of the cereal product; about 22 g or greater per 100 g of the cereal product; about 23 g or greater per 100 g of the cereal product; about 24 g or greater per 100 g of the cereal product; about 25 g or greater per 100 g of the cereal product; about 26 g or greater per 100 g of the cereal product; about 27 g or greater per 100 g of the cereal product; about 28 g or greater per 100 g of the cereal product; about 29 g or greater per 100 g of the cereal product; about 30 g or greater per 100 g of the cereal product; about 31 g or greater per 100 g of the cereal product; about 32 g or greater per 100 g of the cereal product; about 33 g or greater per 100 g of the cereal product; about 34 g or greater per 100 g of the cereal product; about 35 g or greater per 100 g of the cereal product; about 35 g or greater per 100 g of the cereal product; about 37 g per 100 g of the cereal product; about 38 g per 100 g of the cereal product; about 39 g per 100 g of the cereal product; about 40 g per 100 g of the cereal product.

In some embodiments, a cereal product of the present invention includes a slowly-digestible-starch-over-total-available-starch ratio (SDS/(SDS+RDS)) of at least about 31 wt %; at least about 35 wt %; at least about 38 wt %; or at least about 40 wt %. Total available starch comprises SDS and RDS. As stated above, SAG may be used interchangeably with SDS herein. In one embodiment, the difference between total available starch and total starch is that total available starch does not comprise resistant starch that cannot be digested, i.e. that escapes digestion in the small intestine.

In some embodiments, an unbaked SAG content is calculated based on the SAG content of each of the ingredients in a formulation and the weight percent of each of the ingredients in the cereal product. In some embodiments, the nature of the ingredients and/or the processing conditions for preparing the baked cereal product allow for maintenance of the SAG levels throughout processing such as by minimizing damage to the starch and starch gelatinization, thereby resulting in a minimal reduction in SAG content from the unbaked formulation to the baked cereal product. In some embodiments, the baked SAG content of a cereal product is less than about 50% below the unbaked SAG; less than about 45% below the unbaked SAG; less than about 40% below the unbaked SAG; less than about 35% below the unbaked SAG; less than about 30% below the unbaked SAG; less than about 25% below the unbaked SAG; less than about 24% below the unbaked SAG; less than about 23% below the unbaked SAG; less than about 22% below the unbaked SAG; less than about 21% below the unbaked SAG; less than about 20% below the unbaked SAG; less than about 19% below the unbaked SAG; less than about 18% below the unbaked SAG; less than about 17% below the unbaked SAG; less than about 16% below the unbaked SAG; less than about 15% below the unbaked SAG; less than about 14% below the unbaked SAG; less than about 13% below the unbaked SAG; less than about 12% below the unbaked SAG; less than about 11% below the unbaked SAG; less than about 10% below the unbaked SAG; less than about 9% below the unbaked SAG; less than about 8% below the unbaked SAG; less than about 7% below the unbaked SAG; less than about 6% below the unbaked SAG; less than about 5% below the unbaked SAG; less than about 4% below the unbaked SAG; less than about 3% below the unbaked SAG; less than about 2% below the unbaked SAG; less than about 1% below the unbaked SAG; or is about the same as the unbaked SAG. In certain embodiments, the post-baked SAG content of a cereal product may be higher than the unbaked SAG.

In some embodiments, the cereal product comprises a crust portion and a crumb portion, the crust portion enclosing the crumb portion, as described in further detail below.

In some embodiments, the SAG content of the crust portion is greater than 12 g per 100 g of crust portion, greater than 15 g per 100 g of crust portion, preferably greater than about 18 g per 100 g of crust portion, preferably from 15 to 23 g, more preferably from 18 to 22 g, and most preferably from 19 to 21 g per 100 g of crust portion. In some embodiments, the SAG content of the crumb portion is greater than about 8 g per 100 g of crumb portion, greater than about 15 g per 100 g of crumb portion, from about 10 to 20 g per 100 g of crumb portion, from about 12 to 18 g per 100 g of crumb portion, preferably from 15 to 20 g and more preferably from 17 to 19 g per 100 g of crumb portion. These levels of SAG provide a high overall SAG content.

In some embodiments, the cereal product comprises a crust portion and a crumb portion, the crust portion enclosing the crumb portion, wherein the SAG content of the crumb portion per 100 g of crumb portion is at least 70% of the SAG content of the crust portion per 100 g of crust portion, preferably 80-95% of the SAG content of the crust portion per 100 g of crust portion, more preferably 85 to 90%. That is, the central portion formed by the crumb retains the majority of the starch content as SAG.

Sensory Characteristics

Cereal products of the present invention may be formulated and/or prepared to include desirable nutritional and sensory attributes. For example, cereal products of the present invention may be formulated and/or prepared to include a high SAG content, while still maintaining those desired nutrition and sensory attributes. Desired nutrition may include particular levels of whole grains, fat, fiber, protein, vitamins and/or sugar as described herein. Sensory attributes may include textural properties such as soft textures with crunchy inclusions in a dual texture biscuit. This combination of high SAG, desirable nutrition, and desirable sensory attributes is unexpected, particularly in a soft textured product—products with high SAG values and/or desirable nutrition attributes are often associated with undesirable sensory attributes, such as an overly harder or drier texture, while products of embodiments of the present invention include a soft, moist texture and may include crunchy inclusions over the shelf life of the product.

Crumb and Crust

In some embodiments, the cereal product comprises a crust portion and a crumb portion, the crust portion enclosing the crumb portion. The crust portion is the outer portion and the crumb portion is the inner portion. These terms are terms in the art and the skilled person could determine between the crumb and the crust of a cereal product. The crust is the outer portion of the cereal product and has a harder darker texture due to the baking conditions. The crumb is the softer lighter inner or central portion which is protected by the crust.

In some embodiments, the product may be considered as two parts: the crust and the crumb. The crust has a large impact on the SAG (or SDS) content. Without wishing to be bound by theory, it is considered that the high SDS is due to low water available for starch gelatinization as the outer surface dries quickly and forms a crust. Moreover, this crust appears to act as an insulating material and help to limit temperature rise inside the product. The crust provides a rich golden color and an improved overall taste (due to Maillards reactions).

In addition, the crust helps to keep water inside the product during baking (moist texture). This gives the crumb which also has a good SDS impact. The crumb has a high SDS due to internal temperature management.

In some embodiments, the crust portion has a thickness of from 0.5 to 6 mm, more preferably from 1 to 5 mm, still more preferably about 4 mm. In some embodiments, the crumb portion has a thickness in the plane of cereal product of from 6 to 14 mm, preferably from 8 to 12 mm, more preferably about 10 mm. The balance of crust and crumb ensure that the crust is sufficient to protect the inner crumb by insulating it and preventing moisture loss.

In some embodiments, the cereal product comprises a crust portion and a crumb portion, the crust portion enclosing the crumb portion, wherein the crust portion and the crumb portion each have a Lange number, and wherein the Lange number of the crust portion is at least 5 lower than the Lange number of the crumb portion, preferably from 5 to 15 lower and preferably from 7 to 13 lower. In some embodiments, a surface of the cereal product has a Lange number of from 40 to 60, preferably 44 to 50, preferably of from 45 to 48, more preferably of from 46 to 47. As referred to herein, the Lange number refers to that of the cereal product and does not take into account inclusions, which may have a different Lange number to that of the cereal product.

In some embodiments, the cereal product comprises a crust portion and a crumb portion, the crust portion enclosing the crumb portion, wherein the crust portion has a Lange number of from 40 to 60, preferably 44 to 50, preferably of from 45 to 48, more preferably of from 46 to 47, and wherein the crumb portion has a Lange number of from 50 to 70, preferably from 52 to 58, more preferably from 54 to 56. Here, the Lange number refers to that of the crust or crumb portion respectively without taking into account inclusions, which may have a different Lange number to that of the crust or the crumb.

In some embodiments, the cereal product comprises a crust portion and a crumb portion, the crust portion enclosing the crumb portion, wherein the moisture content of the crust portion immediately after baking is from 4 to 10 wt %, preferably from 4 to 8 wt % by weight of the crust, and wherein the moisture content of the crumb portion immediately after baking is from 8 to 14 wt %, preferably 10 to 14 wt % by weight of the crumb. In some embodiments, the moisture of the cereal product is from 9 to 15 wt %, more preferably from 9 to 13 wt %, still more preferably from 10 to 13 wt % and most preferably about 11 wt %.

The following examples, wherein all parts, percentages, and ratios are by weight, and all temperatures are in ° F. unless indicated to the contrary, illustrate some embodiments of the present invention:

EXAMPLES

Example 1

Cereal products were prepared according to the following formulations:

Soft Formula:

| INGREDIENTS | PERCENT OF DOUGH |
| --- | --- |
| Raisin Paste | 6 |
| Canola Oil with Lecithin | 12 |
| Glycerin | 5 |
| Invert syrup | 9 |
| Flavor | <1.0 |

-continued

| INGREDIENTS | PERCENT OF DOUGH |
| --- | --- |
| Salt | <1.0 |
| Starch and/or insoluble fiber and/or flour | <5.0 |
| Sugar and/or inulin powder | 12 |
| Water | 8 |
| Multigrain Blend | 23 |
| Leavening Agent | <1.0 |
| Wheat flour | 23 |
| TOTAL | 100.00% |
| Baked Product SAG | 13% |

Soft Formula with Buckwheat Grits:

| INGREDIENTS | PERCENT OF DOUGH |
| --- | --- |
| Raisin Paste | 6 |
| Canola Oil with Lecithin | 12 |
| Glycerin | 5 |
| Invert syrup | 9 |
| Flavor | <1 |
| Salt | <1 |
| Starch and/or insoluble fiber and/or flour | <5 |
| Sugar and/or inulin powder | 12 |
| Water | 8 |
| Multigrain Blend | 13 |
| Buckwheat Grits | 10 |
| Leavening Agent | <1 |
| Wheat flour | 22 |
| TOTAL | 100.00% |
| Baked Product SAG | 17.3% |

The formulations above demonstrate that the replacement of a portion of the flake blend with buckwheat grits in the formulation significantly enhanced the SAG content in the baked product, as the SAG content increased from 13% to 17.3%.

Example 2

Cereal products were prepared according to the following formulations:

Cake Control Formula:

| Ingredient | Percent of Dough |
| --- | --- |
| Wheat flour | 36 |
| Whole eggs | 13 |
| Canola Oil | 8 |
| Sugar | 12 |
| Glucose Syrup | 12 |
| Glycerin | 6 |
| Texturizing Starch | <2 |
| Salt | <1 |
| Leavening Agents | <2 |
| Water | 8 |
| Total | 100.00% |

Cake Formula with Buckwheat Grits:

| Ingredient | Percent of Dough |
|---|---|
| Buckwheat Grits | 13 |
| Wheat flour | 24 |
| Whole eggs | 13 |
| Canola Oil | 8 |
| Sugar | 12 |
| Glucose Syrup | 12 |
| Glycerin | 6 |
| Texturizing Starch | <2 |
| Salt | <1 |
| Leavening Agents | <2 |
| Water | 8 |
| Total | 100.00% |

The formulations above demonstrate that the replacement of a portion of the wheat flour with buckwheat grits in the formulation significantly enhanced the SAG content in the baked product, as the SAG content increased from 3.1% to 8.4%. The products have a moisture content of 13-15 wt % and a water activity of 0.6-0.7.

Example 3

Three types of soft biscuits were prepared, their formulations differing only in the type of inclusion. The inclusions were present in an amount of about 15 wt % of the soft biscuit. One formulation was prepared with buckwheat grits, one with rye cuts (whole cut rye with the same particle size as the buckwheat grits), and spelt cuts (whole cut spelt with the same particle size as the buckwheat grits).

Soft Formula with Buckwheat Grits:

| INGREDIENTS | PERCENT OF DOUGH |
|---|---|
| Raisin Paste | 6 |
| Canola Oil with Lecithin | 12 |
| Glycerin | 5 |
| Invert syrup | 9 |
| Flavor | <1 |
| Salt | <1 |
| Starch and/or insoluble fiber and/or flour | 5 |
| Sugar and/or inulin powder | 12 |
| Water | 8 |
| Buckwheat Grits or Rye Cuts or Spelt Cuts | 15 |
| Leavening Agent | <1 |
| Wheat flour | 22 |
| TOTAL | 100.00% |

| Inclusions in the above formula | Inclusion Level (%) | Baked Product SAG (%) |
|---|---|---|
| Buckwheat Grits | 15 | 22.3 |
| Rye Cuts | 15 | 16.7 |
| Spelt Cuts | 15 | 15.7 |

An additional type of soft biscuit was prepared, including buckwheat grits and rice crisps, according to the following formulation:

| INGREDIENTS | PERCENT OF DOUGH |
|---|---|
| Canola Oil with Lecithin | 10 |
| Glycerin | 7 |
| Invert and/or Glucose Syrups | 6 |
| Flavor | <1 |
| Water | 7 |
| Buckwheat Grits | 15 |
| Granulated Sugar | 7 |
| Inulin | 7 |
| Starch | <1 |
| Leavening Agent | <2 |
| Salt | <1 |
| Wheat flour | 34 |
| Inclusions such as rice or whey crisps | 5 |
| TOTALS: | 100.00% |

When the biscuits were seven months old, they were analyzed for texture using a compressive force method. The biscuits were each compressed to 99% compression, using a TAXT Plus texture analyzer (Stable Micro Systems, UK). Test conditions were as follows: 5 mm diameter cylinder probe, test speed 0.1 mm/sec, compress 99% of original sample height. The biscuits were each probed at nine sites. The force needed to achieve 99% compression and the gradient of the force (grams) versus time (seconds) plot from 97% to 99% compression at each site was recorded.

The average measurements for two biscuits for each type of inclusion, with nine probes on each biscuit, are as follows:

| Inclusions in Formulation | Gradient (slope) Grams/second |
|---|---|
| Buckwheat grits | 2102.2 |
| Buckwheat grits w/rice crisps | 2242.0 |
| Cut spelt | 1199.8 |
| Rye cuts | 1484.3 |

The results show that the formulation including the buckwheat grits, with or without rice crisps, has a significantly crunchier texture than the formulations with cut spelt or rye cuts, showing that the buckwheat grits provide a higher level of distinct crunchy texture in the overall soft biscuit. This texture of the buckwheat grits was maintained over time, as the tested biscuits were seven months old. These results are particularly notable because the rye and spelt have a harder initial texture than the buckwheat grits, before being included in the soft biscuit formulation. Without wishing to be bound by theory, it is believed that the buckwheat grits are able to resist absorption of moisture from the soft biscuit formulation and therefore retain their crunchy texture, possibly due to an outer shell that can act as a moisture barrier. The rye cuts and cut spelt, on the other hand, developed a tough and chewy texture upon inclusion in the soft biscuit formulation despite having an initial texture harder than the buckwheat grits.

Example 4

Cereal products were prepared, each with a different type of inclusion. The following table shows the amount of each inclusion in the dough, the SDS of each inclusion, the calculated product SDS, and the measured product SDS:

| Grain Type | Grain Level (wt % of dough) | Grain SAG (%) | Theoretical Product SAG (%) | Measured Product SAG (%) |
| --- | --- | --- | --- | --- |
| Buckwheat Grits | 15 | 58 | 20 | 20.8 |
| Cracked Millo | 15 | 27 | 15 | 15.9 |
| Cut Triticale | 15 | 29 | 15 | 17.2 |
| Cut Spelt | 15 | 37 | 17 | 18.1 |
| Oat Cuts | 15 | 27 | 15 | 18.1 |
| Hulled Whole Millet | 15 | 25 | 15 | 15.0 |

The table below shows the amount of each inclusion in the dough, the dough SAG, the SAG of the baked product, and the percent of SDS after baking.

| Formulation | Grain Type | Grain Level (wt % of dough) | Dough SAG (%) | Product SAG (%) | SAG Retention (%) |
| --- | --- | --- | --- | --- | --- |
| 1 | Buckwheat Grits | 15 | 27.1 | 21.7 | 80 |
| 2 | Whole Grain Buckwheat Cuts | 15 | 25.3 | 20.6 | 81 |
| 3 | Whole Grain Buckwheat Cuts | 5 | 19.5 | 15.9 | 82 |
|   | Hulled Whole Millet | 10 |  |  |  |
| 4 | Whole Grain Buckwheat Groats | 15 | 24.1 | 19 | 79 |
| 5 | Whole Grain Buckwheat Cuts | 10 | 23.3 | 20.3 | 87 |
|   | Cut Spelt | 5 |  |  |  |
| 6 | WG Buckwheat Cuts | 10 | 21.9 | 19.4 | 89 |
|   | Cut Triticale | 5 |  |  |  |
| 7 | WG Buckwheat Cuts | 5 | 21 | 18 | 86 |
|   | Hulled Whole Millet | 5 |  |  |  |
|   | Cut Spelt | 5 |  |  |  |

The values in the table show that the use of the inclusions is able to provide a cereal product with a high SAG. The grains and seed were able to maintain a high percentage of the SAG (79% or more) between the dough stage and the final product stage.

Example 5

Cereal products were prepared according to the following general formulation:

| Ingredients | Percent of Dough |
| --- | --- |
| Wheat flour | 31 |
| Buckwheat Grits | 16 |
| Flour, flake and bran blend | 3.5 |
| Vegetable oil with emulsifier | 9 |
| Glycerin | 7 |
| Inulin | 5 |
| Sugar | 3 |
| Isomaltulose | 5 |
| Leavening agent | <1 |
| Salt | <1 |
| Water | 7-10 |
| Glucose and/or invert Syrups | 6 |
| Inclusions such as rice or whey crisps and/or chocolate chips or dried fruit pieces | 5-10 |
| Flavor | <1 |
| Total before cooking | 100.00% |

Other variations were also prepared: the variables included, modified starch, whey crisps, chocolate chips, fruit inclusions, a variety of sucrose levels, combinations of the above, and higher glycerin levels. Each formulation provided a soft-textured biscuit having a desirable level of SAG ranging from about 15% to about 23% with inclusions having a distinct, pleasant crunch.

It is to be understood that at least some of the descriptions of the invention have been simplified to focus on elements that are relevant for a clear understanding of the invention, while eliminating, for purposes of clarity, other elements that those of ordinary skill in the art will appreciate may also comprise a portion of the invention.

As used herein, the term "about" is understood to mean ±10% of the value referenced. For example, "about 45%" is understood to literally mean 40.5% to 49.5%.

We claim:

1. A soft-textured baked cereal product comprising:
a SAG content of greater than about 15 g per 100 g of soft-textured baked cereal product;
a water activity of about 0.6 to about 0.9;
a flour component comprising refined wheat flour; and
seeds in the form of flakes, grits, groats, or combinations thereof comprising buckwheat, rye, spelt, millet, triticale, or combinations thereof, wherein:
the seeds in the form of flakes, grits, groats, or combinations thereof are present in a total amount of about 10 wt % to about 16 wt % of the soft-textured baked cereal product, and
the seeds in the form of flakes, grits, groats, or combinations thereof contribute to the SAG content of greater than about 15 g per 100 g of soft-textured baked cereal product.

2. The soft-textured baked cereal product of claim 1, comprising a moisture content of about 5 wt % or more.

3. The soft-textured baked cereal product of claim 1, comprising inclusions having a texture discernable from a texture of a matrix of the baked cereal product.

4. The soft-textured baked cereal product of claim 3, wherein the inclusions maintain their texture for at least six months.

5. The soft-textured baked cereal product of claim 1, wherein the seeds in the form of flakes, grits, groats, or combinations thereof comprise buckwheat.

6. The soft-textured baked cereal product of claim 1, comprising buckwheat grits, groats and/or cuts.

7. The soft-textured baked cereal product of claim 1, wherein the baked cereal product consists of ingredients that are characterized by a combined unbaked SAG content and the SAG content of the soft-textured baked cereal product, wherein the SAG content of the soft-textured baked cereal product is less than about 40% below the combined unbaked SAG content of the ingredients.

8. The soft-textured baked cereal product of claim 1, wherein the cereal product comprises a crust portion and a crumb portion, the crust portion enclosing the crumb portion,
   wherein the SAG content of the crust portion is greater than 15 g per 100 g of crust portion, or
   wherein the SAG content of the crumb portion is greater than about 15 g per 100 g of crumb portion.

9. The soft-textured baked cereal product of claim 1, wherein the cereal product comprises a crust portion and a crumb portion, the crust portion enclosing the crumb portion,
   wherein the SAG content of the crumb portion per 100 g of crumb portion is at least 70% of the SAG content of the crust portion per 100 g of crust portion.

10. A baked food bar comprising:
    (a) a water activity of about 0.6 to about 0.9;
    (b) a SAG content of greater than about 15 g per 100 g of food bar;
    (c) a heat processable binder; and
    (d) seeds in the form of flakes, grits, groats, or combinations thereof comprising whole grain buckwheat in an amount of about 10 wt % to about 16 wt % of the food bar such that the seeds in the form of flakes, grits, groats, or combinations thereof contribute to the SAG content of greater than about 15 g per 100 g of food bar.

11. The soft-textured baked cereal product of claim 1, wherein the flour component further comprises buckwheat, rye, spelt, millet, triticale, or combinations thereof.

12. The soft-textured baked cereal product of claim 1, wherein the seeds comprising buckwheat, rye, spelt, millet, triticale, or combinations thereof are in the form of flakes.

13. The soft-textured baked cereal product of claim 1, wherein the seeds comprising buckwheat, rye, spelt, millet, triticale, or combinations thereof are in the form of groats, grits, cuts, or combinations thereof.

14. The soft-textured baked cereal product of claim 1 further comprising wheat flour and about 5% up to about 7% inulin.

15. The soft-textured baked cereal product of claim 1 further comprising from about 0.1 wt % up to about 14 wt % total sweetener consisting essentially of sugar and inulin.

16. The soft-textured baked cereal product of claim 1 further comprising a up to about 10% fructose.

* * * * *